United States Patent
Xue et al.

(10) Patent No.: US 7,218,705 B2
(45) Date of Patent: May 15, 2007

(54) SYSTEMS, METHODS AND APPARATUS TO OFFSET CORRECTION OF X-RAY IMAGES

(75) Inventors: Ping Xue, Cottage Grove, WI (US); Donald F Langler, Cottage Grove, WI (US)

(73) Assignee: General Electric, Schenectady, NY (US)

( * ) Notice: Subject to any disclaimer, the term of this patent is extended or adjusted under 35 U.S.C. 154(b) by 108 days.

(21) Appl. No.: 11/165,775

(22) Filed: Jun. 25, 2005

(65) Prior Publication Data

US 2006/0291624 A1    Dec. 28, 2006

(51) Int. Cl.
*H05G 1/64*    (2006.01)

(52) U.S. Cl. .................... 378/98.8; 378/98.7; 378/207; 382/132

(58) Field of Classification Search .............. 378/19, 378/21, 62, 98, 98.8, 98.11, 98.12, 108, 116, 378/207; 382/132, 274; 250/252.1
See application file for complete search history.

(56) References Cited

U.S. PATENT DOCUMENTS 5,400,384 A * 3/1995 Fernandes et al. .......... 378/108
6,353,654 B1 * 3/2002 Granfors et al. .............. 378/62
6,798,864 B2 * 9/2004 Petrick et al. ............. 378/98.8
7,003,146 B2 * 2/2006 Eck et al. ................... 382/132

* cited by examiner

*Primary Examiner*—Jurie Yun
(74) *Attorney, Agent, or Firm*—Carl Horton; Peter Vogel; Ellis B. Ramirez

(57) ABSTRACT

Systems and methods are provided for offset correction of images from a flat panel detector. In some embodiments, the apparatus and method develops one or more offset maps, acquired during system idle, for the imaging system at a plurality of exposure windows. In some embodiments, exposure parameters acquired for the imaging system before image acquisition are used to select an offset map to subtract from subsequent X-ray images. In some further embodiments, executable instructions are disclosed for directing a processor to compile one or more offset map and exposure parameters to subtract based on a selected offset map noise elements from X-ray images and thereby minimizing the time between image acquisition and display of processed images.

25 Claims, 7 Drawing Sheets

SYSTEMS, METHODS AND APPARATUS TO OFFSET CORRECTION OF X-RAY IMAGES

FIELD OF THE INVENTION

The invention relates to an X-ray examination apparatus and to a method for bad pixel identification and correction in large area solid-state x-ray detectors forming an X-ray image.

BACKGROUND OF THE INVENTION

The flat panel detector is an array comprising a plurality of pixels in the form of a matrix. Each pixel comprises scintillating layer in contact with an array of photo diodes which converts impinging X-ray signals to charge signals. A semiconductor switch is used to select the rows read from the detected charge signal at the flat panel detector. A two dimensional image is produced by the flat panel detector of an object radiated by the x-ray source. This two-dimensional X-ray image is converted to an electric signal for imaging analysis and displaying. During read-out of the X-ray detector, rows of transistors are turned on sequentially, and an entire row of detector elements is read out at the same time.

Because of imperfections in the transistors, a time-dependent background current is generated when the transistors are turned on and off or as is commonly know as switching states. The result is an offset signal that is unrelated to X-ray exposure. The offset signal is typically referred to as switching charge retention. Since the rows are read sequentially, a portion of the switching charge retention is row correlated or roughly the same for all elements in a given row, but varies from row to row. However, the switching charge retention for a given row changes with the frame rate of the imaging system.

For the reasons stated above, and for other reasons stated below which will become apparent to those skilled in the art upon reading and understanding the present specification, there is a need in the art for reducing signal conversion time by adjusting for offset signals. There is also a need for improving x-ray images through offset correction.

BRIEF DESCRIPTION OF THE INVENTION

The above-mentioned shortcomings, disadvantages and problems are addressed herein, which will be understood by reading and studying the following specification.

In one aspect, a method for compensating for offset signals produced by a flat panel detector is described and performing the following actions: generating one or more offset map for the detector, generating a pre-exposure x-ray to ascertain exposure parameters for the detector, selecting an offset map based on the exposure parameters, and applying the offset map to subsequent images produced by the flat panel detector. Further, the generated one or more offset map are stored in a lookup table having a plurality of exposure windows and a plurality of offsets.

In yet another aspect, a method for tomosynthesis x-ray imaging by performing the action of acquiring one or more offset map for an imaging system, acquiring exposure parameters, irradiating an object with x-ray radiation from a series of positions defining an arc about a region, detecting the radiation transmitted through the object with a stationary detector array and storing image data for each of the positions, the image data being representative of x-ray intensity values, applying correction to the store image data, repeating the actions of irradiating and correction until the section of the object has been imaged, and generating a three-dimensional.

In still another aspect, a computer-readable medium on which is stored executable instructions for reducing a noise appearing in an X-ray image obtained from an X-ray apparatus including a detector having a plurality of pixels in a matrix, the executable instructions capable of directing a processor to perform the actions of acquiring one or more offset map for said X-ray apparatus, acquiring exposure parameters for said X-ray apparatus, selecting an offset map from said one or more offset map from the determined exposure parameters, extracting an offset noise element included in the X-ray image, and subtracting based on the selected offset map the noise element extracted from the X-ray image.

An X-ray diagnosis apparatus having a generator configured to generate X-ray signals; a flat panel detecting device, including a plurality of pixels in a matrix, configured to detect said X-ray signals, and a processor device configured to process the detected X-ray signals so as to obtain an X-ray image. The processor includes a look-up table with one or more offset map for a flat panel detecting device, wherein the one or more offset map were acquired during a non-imaging state, a first storage device for storing exposure parameters from a pre-exposure x-ray generated by the flat panel detecting device, a second storage device for storing an offset map selected from said one or more offset map and exposure parameters in the first storage device, and an image processing device for applying the selected offset map to x-ray images from the flat panel detecting device.

Systems, methods, and computer-readable media of varying scope are described herein. In addition to the aspects and advantages described in this summary, further aspects and advantages will become apparent by reference to the drawings and by reading the detailed description that follows.

DETAILED DESCRIPTION OF THE INVENTION

In the following detailed description, reference is made to the accompanying drawings that form a part hereof, and in which is shown by way of illustration specific embodiments which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

System Level Overview

Figure 1:
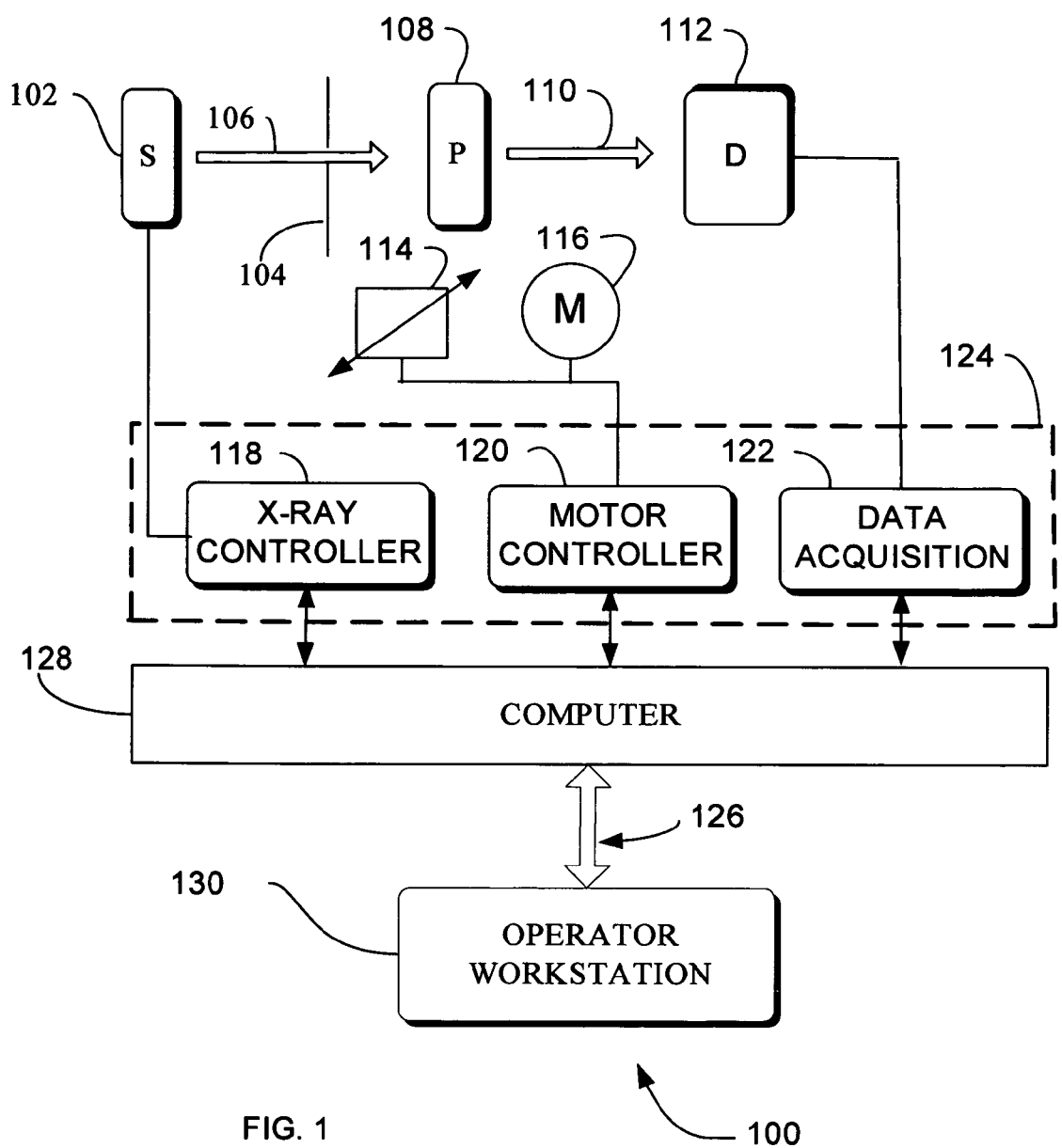
FIG. 1 is a diagram illustrating a system-level overview of an embodiment for an imaging system.

FIG. 1 illustrates diagrammatically an imaging system 100 for acquiring and processing tomography image data for full-field digital mammography (FFDM). In the illustrated embodiment, system 100 is a computed tomography (CT) system designed both to acquire original image data and to process the image data for display and analysis. Alternative embodiments of system 100 can include a positron emission tomography (PET) mammography system, a nuclear medicine breast imaging system (scintimammography), a thermoacoustic tomography breast imaging system (TCT), an electrical impedance mammography system (EIT), near-infrared mammography systems (NIR), and X-ray tomosynthesis mammography systems (XR).

In FIG. 1, imaging system 100 includes a source of X-ray radiation 102 positioned adjacent to a collimator 104. In this arrangement, the source of X-ray radiation source 102 is typically an X-ray tube. Other modalities, however, possess different sources of imaging energy or radiation. For instance, modalities such as PET and nuclear medicine imaging utilize an injectable radionucleotide as a source 102, and source 102 encompasses such alternative sources of imaging energy or radiation which are utilized in tomography imaging systems. Source 102 is controlled by a system controller 124 which furnishes both power and control signals for CT examination sequences. Imaging system 100 solves the need in the art for examining a detailed area of a patient without biopsy.

Returning to the computed tomography of FIG. 1, the collimator 104 permits a stream of radiation 106 to pass into a region in which a subject, such as a human patient 108 is positioned. A portion of the radiation 110 passes through or around the subject and impacts a detector array, represented generally at reference numeral 112. In full-filed digital mammography (FFDM) detection can be based on indirect detection (charge collection), direct detection, or direct photon counting. In direct detection (for instance aSe) the X-ray photons directly lead to charges (electron-hole pairs) and thus to an electric signal in a photoconductor. In indirect detection (for instance photostimulable phosphors, CsI(Tl)-CCD and CsI(Tl)-αSi) light photons causes an electric charges resulting in an electric signal in a photo detector. In both cases, the electric signal produced is the result of interaction from typically hundreds of X-ray photons. The digitized electric signal represents the intensity level in a pixel formed bit the flat panel detector. In direct photon counting techniques (for instance Si(B)) single photons are counted. In this case, the number of photons directly represents the intensity level in a pixel.

Regardless of the detection used for acquiring imaging data the detector 112 is arranged to resemble an array with rows and columns where each element produces electrical signals that is proportional to the intensity of the incident X-ray beam. These signals are acquired and processed to reconstruct an image of the features within the subject. Moreover, detector 112 is coupled to the system controller 124, which commands acquisition of the signals generated in the detector 112. The system controller 124 executes various signal processing and filtration functions such as initial adjustment of dynamic ranges, interleaving of digital image data, and so forth. In general, system controller 124 commands operation of the imaging system to execute examination protocols and to process acquired data. In the present context, system controller 124 also includes signal processing circuitry, typically based upon a general purpose or application-specific digital computer, associated memory circuitry for storing programs and routines executed by the computer, as well as configuration parameters and image data, interface circuits, and so forth.

In the arrangement illustrated in FIG. 1, system controller 124 is coupled to a linear positioning subsystem 114 and rotational subsystem 116 used to move the detector 112 to specific area or region to image part of the patient's body. The rotational subsystem 116 enables the X-ray source 102, collimator 104 and the detector 112 to be rotated one or multiple turns around the region to be imaged. Additionally, it should be noted that the rotational subsystem 116 may include a gantry suitably configured to receive the region to be imaged, such as a human breast in a CT mammography system. Thus, the system controller 124 may be utilized to operate the gantry. The linear positioning subsystem 114 enables the detector to be moved along the imaged region allowing images to be generated of particular areas of the patient 108.

Additionally, as will be appreciated by those skilled in the art, the source of radiation may be controlled by an X-ray controller 118 disposed within the system controller 124. Particularly, the X-ray controller 118 is configured to provide power and timing signals to the X-ray source 102. Further, it should be understood that the source 102, detector array 112, and X-ray controller 118 comprise suitable analog circuitry for performing their operations.

A motor controller 120 may be utilized to control the movement of the rotational subsystem 116 and the linear positioning subsystem 114. Further, the system controller 124 is also illustrated comprising a data acquisition system 122. In this arrangement, the detector 112 is coupled to the system controller 124, and more particularly to the data acquisition system 122. The data acquisition system 122 receives data collected by readout electronics of the detector 112. The data acquisition system 122 typically receives sampled analog signals from the detector 112 and coverts the data to digital signals with offset correction for subsequent processing by a computer 128 through a data interchange device 126 such as a LAN, WAN, or Internet. The data acquisition 122 can be performed at the detector 122 level without departing from the concept of the invention.

The computer 128 is typically coupled to the system controller 124. The data collected by the data acquisition system 122 may be transmitted to the computer 128 and to a memory or any other suitable device for storing information. It should be understood that any type of memory to store a large amount of data may be utilized by such an exemplary system 100. In addition, computer 128 is configured to receive commands and scanning parameters from an operator via an operator workstation 130 typically equipped with a keyboard and other input devices. An operator may control the system 100 via the input devices. The operator may observe the reconstructed image, initiate imaging, and monitor or track other data relevant to the imaging system from computer 128.

The display coupled to the operator workstation 130 or computer 128 may be utilized to observe the reconstructed image and to control imaging. An example of such a display may be found in the General Electric SENOGRAPH® 2000D workstation. Additionally, the reconstructed image may also be printed by an appropriate printer electrically coupled to the computer 128 and the operator workstation 130. Further, the operator workstation 130 may be electrically coupled to a picture archiving and communications system through appropriately programmed ports. This picture archiving and communications system may also be electrically coupled to a remote system (not shown), radiology department information system, and hospital information system or to an internal or external network, so that others at different locations may gain access to the image and to the image data through a network such as the internet.

It should be further noted that the computer 128 and operator workstation 130 may be coupled to other output devices which may include standard or special purpose computer monitors and associated processing circuitry. One or more operator workstations 130 may be further linked in the system for outputting system parameters, requesting examinations, viewing images, and so forth. In general, displays, printers, workstations, and similar devices supplied within the system may be local to the data acquisition components, or may be remote from these components, such as elsewhere within an institution or hospital, or, in an entirely different location, linked to the image acquisition system via one or more configurable networks, such as the Internet, virtual private networks, and so forth.

Figure 2:
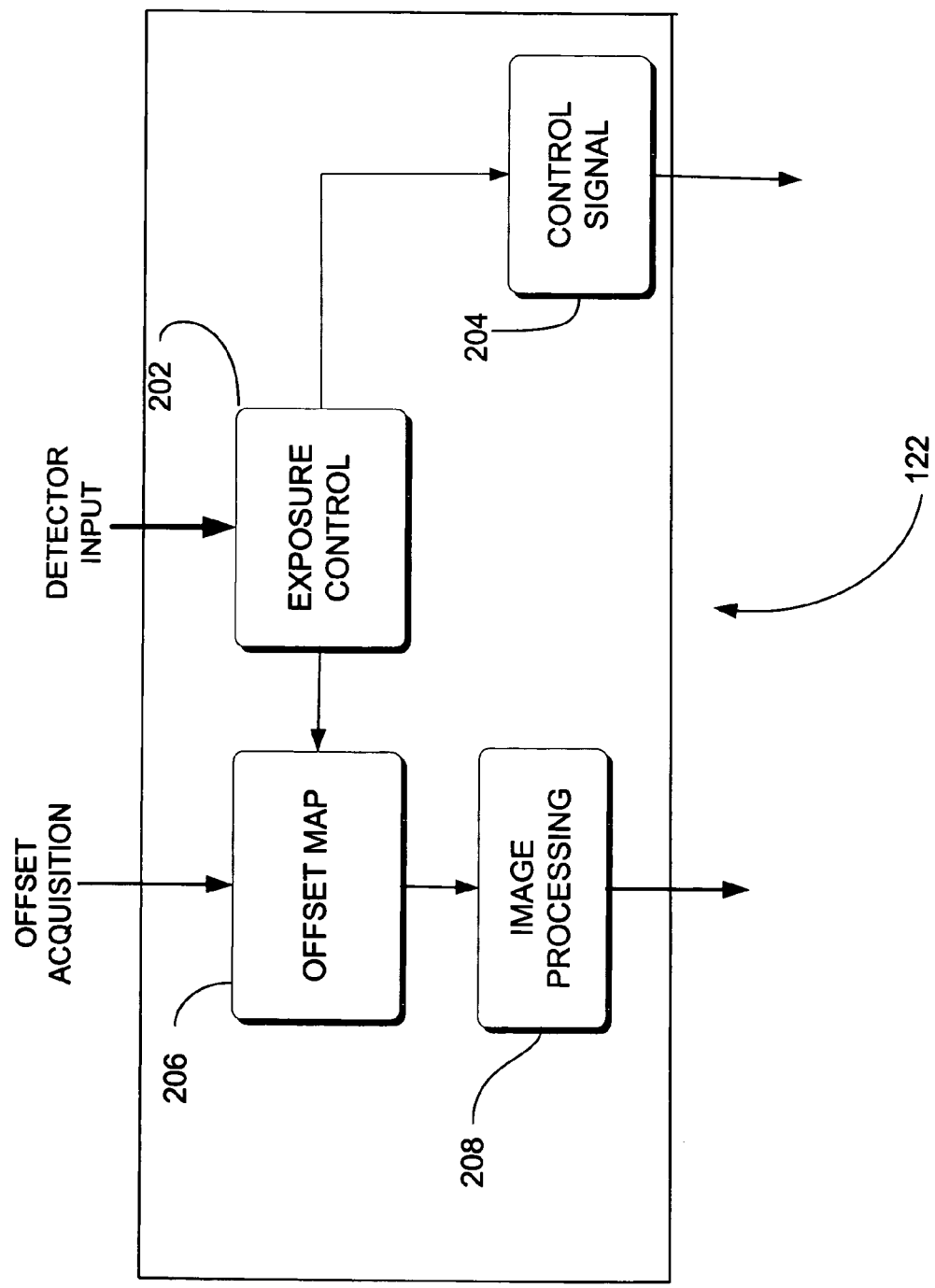
FIG. 2 is a block diagram of an data acquisition system according to an embodiment.

FIG. 2 illustrates data acquisition 122 in detail. Data acquisition 122 receives signals from detector 112 at exposure control 202. The exposure control after processing generates signals to offset map unit 206 and to control signal generator 204. The control signal generator 204 generates data useful to x-ray source 102 and detector 112 to accomplish image acquisition. Exposure control 202 or automatic exposure control (AEC) is used in x-ray imaging equipment to control the exposure per image or exposure time. The goal is to maintain image quality while minimizing patient exposure. The AEC develops a signal proportional to the x-ray flux into the image receptor. This signal is used to regulate the total exposure for each image either by terminating the exposure or by adjusting the x-ray flux rate. In this usage, the x-ray technique (kVp, spectral filter, focal spot, etc) is prescribed by the operator. Often these are preset and selected based on the size and composition of the object to be imaged—in a patient that would be the size and anatomy. Thus, the role of the AEC is to regulate and insure correct exposure. In general, a preshot image from digital detector 112 is used to determine the automatic exposure control for the radiographic device. The preshot image is obtained from a small dose of x-rays occurring before the x-ray exposure that results in an image of a patient. The number, location and size of the regions of interest (ROIs) on the preshot image, are used for exposure control, and are defined based on a prescribed anatomy/view or are automatically calculated from the image data created in detector 112. Different image based algorithms can be used to derive the appropriate ROIs. The simplest approach is to create the ROIs that have the same size and shape as the ion chamber cells (not shown). The system defines the Preshot parameters based on the following parameters prescribed by a user of the system: anatomy/view, patient dose selection and patient size. The user enters the parameters from operator interface at computer 128 or workstation 130. The Preshot parameters include the x-ray exposure technique, the detector timing, and the synchronization between these two. The x-ray exposure technique includes KV, ma, Mas and many other parameters known to x-ray technicians. The detector timing includes offset timing and readout time. However, for selecting an offset map the critical parameter is the exposure time of the radiographic device given the preshot parameters, exposure technique, and detector timing. Signals from the exposure control unit 202 are used by control signal generator 204 to generate signals for operating x-ray source 102 during imaging acquisition by the imaging system 100.

Offset map 206 develops a collection of values for offset correction. Offset correction at a given radiographic device is primarily caused by pixel leakage in the imaging device such as flat panel detectors. Offset map 206 represents the values acquired for imaging system 100 by following the method of FIG. 5. During idle the imaging system 100 automatically acquire multiple offset with different fixed time windows (expressed in milliseconds) such as, 16 or 32 offsets, with windows at 50 ms, 100 ms, 150 ms, 200 ms, 250 ms, 300 ms, . . . , 500 ms. The imaging system produces a table having rows of offsets {1 . . . N} and columns of fixed time windows {50 ms . . . 500 ms.}. After each acquisition, the system averages 16 or 32 offsets for each fixed window, create an offset map, such as, offset050.map, offset100.map, etcetera, and stores them in the imaging system memory 100. It should be noted that the plurality of windows are selected based on the application of the imaging system 100. For example, in the application to mammography the lower range can be 50 milliseconds while the upper range is 6 seconds. For other applications the lower range can be as low as two (2) milliseconds and the upper range can be as high as 2 seconds. After each acquisition, the imaging system 100 may average the offsets for each fixed window and create an additional entry in the offset map reflecting an average offset map along the plurality of exposure windows for the imaging device. In the alternative, the imaging system 100 may use only the average offset map for offset correction during imaging acquisition. The exposure control 202 determines the actual x-ray exposure length and then the offset map system 202 automatically selects the pre-determined x-ray window that just cover the required x-ray exposure time. For example, if the exposure length is 250 ms then an offset map will be selected from the table (offset map) that will be used in imaging processing of the x-ray images from the imaging device. This offset map can be selected from the set of offsets at the given window or for the average at the given window as noted above for producing an offset table. Finally, image processing device 208 uses the selected offset map 206 along with the signals from detector 112 to produce an image of the region of interest that is substantially pixel leakage free.

Figure 3:
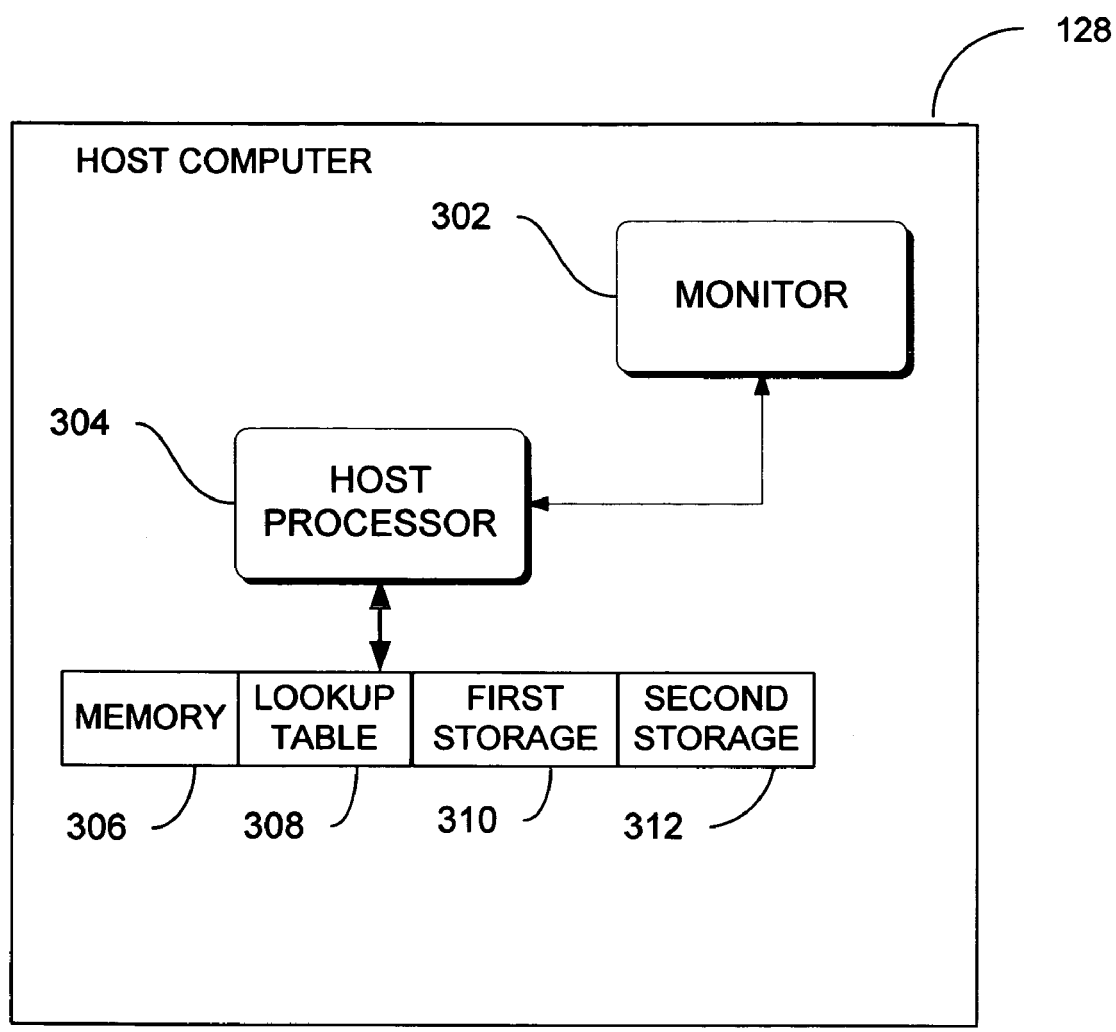
FIG. 3 is a block diagram of a host computer according to an embodiment.

FIG. 3 is a representation of host computer 128 that could used by imaging system 100 to acquire, process, store, and process x-ray images. Computer 128 also includes an operating system (not shown) stored on the computer-accessible media RAM, ROM, and mass storage device 306, and is and executed by host processor 304. Examples of operating systems include Microsoft Windows®, Apple MacOS®, Linux®, UNIX®. Examples are not limited to any particular operating system, however, and the construction and use of such operating systems are well known within the art. Embodiments of computer 128 are not limited to any type of computer. In varying embodiments, computer 128 comprises a PC-compatible computer, a MacOS®-compatible computer, a Linux®-compatible computer, or a UNIX®-compatible computer. The construction and operation of such computers are well known within the art. Computer 128 can be operated using at least one operating system to provide a graphical user interface (GUI) including a user-controllable pointer. Computer 128 can have at least one web browser application program executing within at least one operating system, to permit users of computer 128 to access intranet or Internet world-wide-web pages as addressed by Universal Resource Locator (URL) addresses. Examples of browser application programs include Netscape Navigator® and Microsoft Internet Explorer®. The computer 402 can operate in a networked environment using logical connections to one or more remote computers, such as operator workstation 130. These logical connections are achieved by a communication device coupled to, or a part of, the computer 128. Embodiments are not limited to a particular type of communications device. The operator workstation 130 can be another computer, a server, a controller, a network PC, a PID controller, a router, a client, a peer device or other common network node. The host processor 304 can have access to additional memories such as memory 306, lookup table 308, first storage 310, and second storage 312 that can be assigned or segmented from existing memories to store images, programs, and data such as the offset map. A lookup table has values arranged in rows and columns. Each value has a predefined relationship to the other values. The offset map is arranged in a table format having row label as offsets and column labels as exposure length. An additional entry is created for an average offset for each exposure length.

The system level overview of the operation of an embodiment has been described in this section of the detailed description. The imaging system 100 acquires image, applies offset correction, and displays all within the x-ray acquisition period. While the imaging system 100 is not limited to any particular imaging source 102, detector 112, or data processing 128, for sake of clarity a simplified block diagram has been described.

Methods of an Embodiment

In the previous section, a system level overview of the operation of an embodiment was described. In this section, the particular methods performed by the server and the clients of such an embodiment are described by reference to a series of flowcharts. Describing the methods by reference to a flowchart enables one skilled in the art to develop such programs, firmware, or hardware, including such instructions to carry out the methods on suitable computerized clients. Similarly, the methods performed by the server computer programs, firmware, or hardware are also composed of computer-executable instructions. Methods 400–500 are performed by a client program executing on, or performed by firmware or hardware that is a part of, a computer, such as computer 128 in FIG. 1, and is inclusive of the acts required to be taken by an imaging system.

Figure 4:
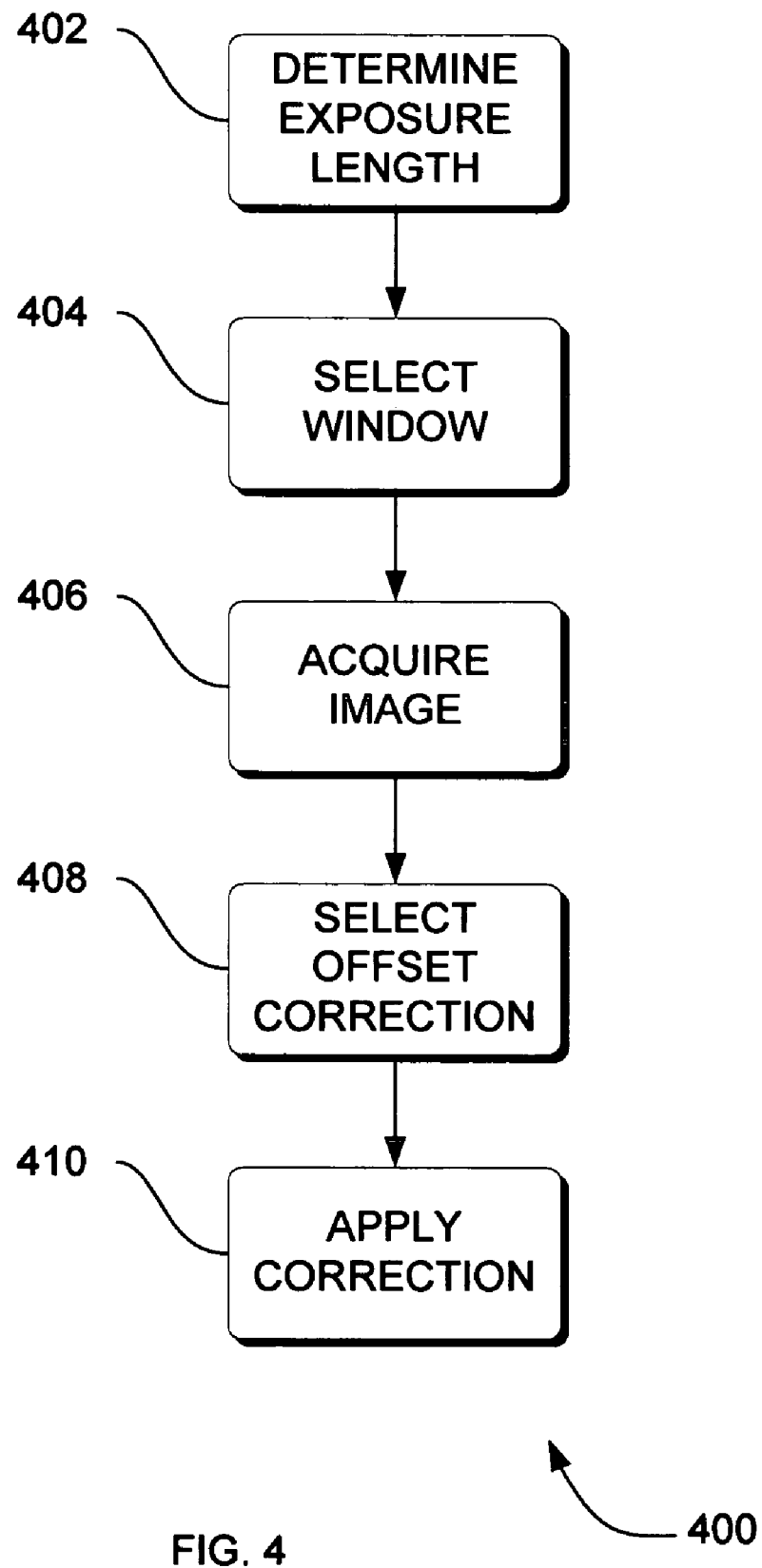
FIG. 4 is a flowchart according to an embodiment for applying offset correction to an image acquired with an x-ray imaging system.

FIG. 4 is a flowchart of a method 400 performed by a computer according to an embodiment. Method 400 meets the need in the art for faster signal conversion by processing an x-ray image in parallel with image sequence acquisition thus minimizing time between the acquisition and final display of processed images.

Method 400 begins with action 402 by determining the exposure length for imaging system 100. The exposure length is the length of time the detector 112 was exposed by the x-ray source to form an image of the desired region. Thus, the length represents a window of time where detector 112 receives energy causing pixels to be formed to represent an image of the area of interest. Once the exposure length or exposure window is determined control passes to action 404 for further processing.

In action 404, an exposure window is selected. The determined exposure length in action 402 is used by the system to select an offset map exposure window combination for flat panel detector 112 from lookup table 308. As noted earlier pluralities of fixed windows correspond to one or more averaged offset maps for the given imaging device. It should be noted that exposure length of action 402 and the exposure window in lookup table 308 do not always coincide, so when selecting the offset map it should be based on the next higher offset map in lookup table 308 to be inclusive of the exposure window determined in action 402. For example, assuming that the determined exposure length is 265 milliseconds (ms) and the lookup table 308 has exposure windows for 250 ms and 300 ms, then, the selected window will be 300 ms in order to correct for offset signals from detector 112. Once the window has been selected control passes to action 406 for further processing.

In action 406, an image is acquired. Action 406 acquires the image from detector 112. The image is an x-ray image of a patient or object due to the energy of the x-ray source 102 striking a patient 108 and causing detector 112 to convert the light photons into an electrical signal. The detector 112, circuitry in data acquisition 122, or software in computer 128 or data acquisition 122 collects, processes and enhances the x-ray image signal to form a representation of the patient's or object's region of interest. Once the image has been acquired control passes to action 408 for further processing.

In action 408, an offset map is selected. Action 408 selects the offset map from lookup table 308. It should be noted that the selected offset map is likely to be the average offset map for the given exposure length as a way to minimize natural variations in offset reading. Once the correction offset map is selected control passes to action 410 for further processing.

In action 410, offset correction map is applied for all images produced by the imaging system.

Figure 5:
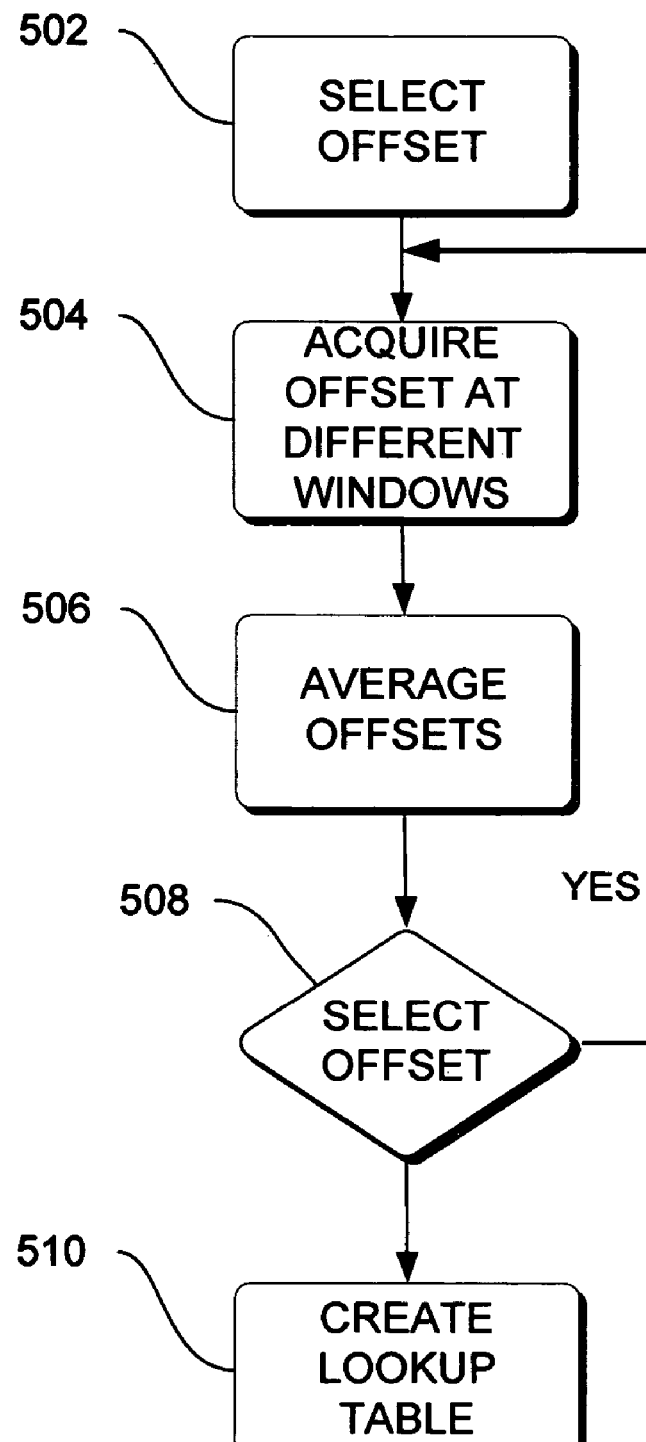
FIG. 5 is a flowchart for developing an offset map to apply offset correction to an image acquired with an x-ray imaging system.

FIG. 5 is a flowchart of a method 500 performed by a computer according to an embodiment. Method 500 meets the need in the art for faster signal conversion by processing an x-ray image in parallel with image sequence acquisition thus minimizing time between the acquisition and final display of processed images.

Method 500 starts with select offset in action 502. Either the data processing system or operator at workstation 130 perform the selection of the number of offset maps for imaging system 100. An offset map taken at different exposure windows represent data points for that system before x-ray imaging, the offset map is held in memory (offset map table) for use by imaging system 100 in performing image correction. As such, the offset map is a calibration or compensation that best describe the current operation of flat panel detector 112. The number of offset maps could be one to many, in practice; however, sixteen (16) to thirty two (32) offsets maps are acquired and then averaged along a set of exposure lengths. Once the number of offsets maps have been selected control passes to action 504 for further processing.

Figure 6:
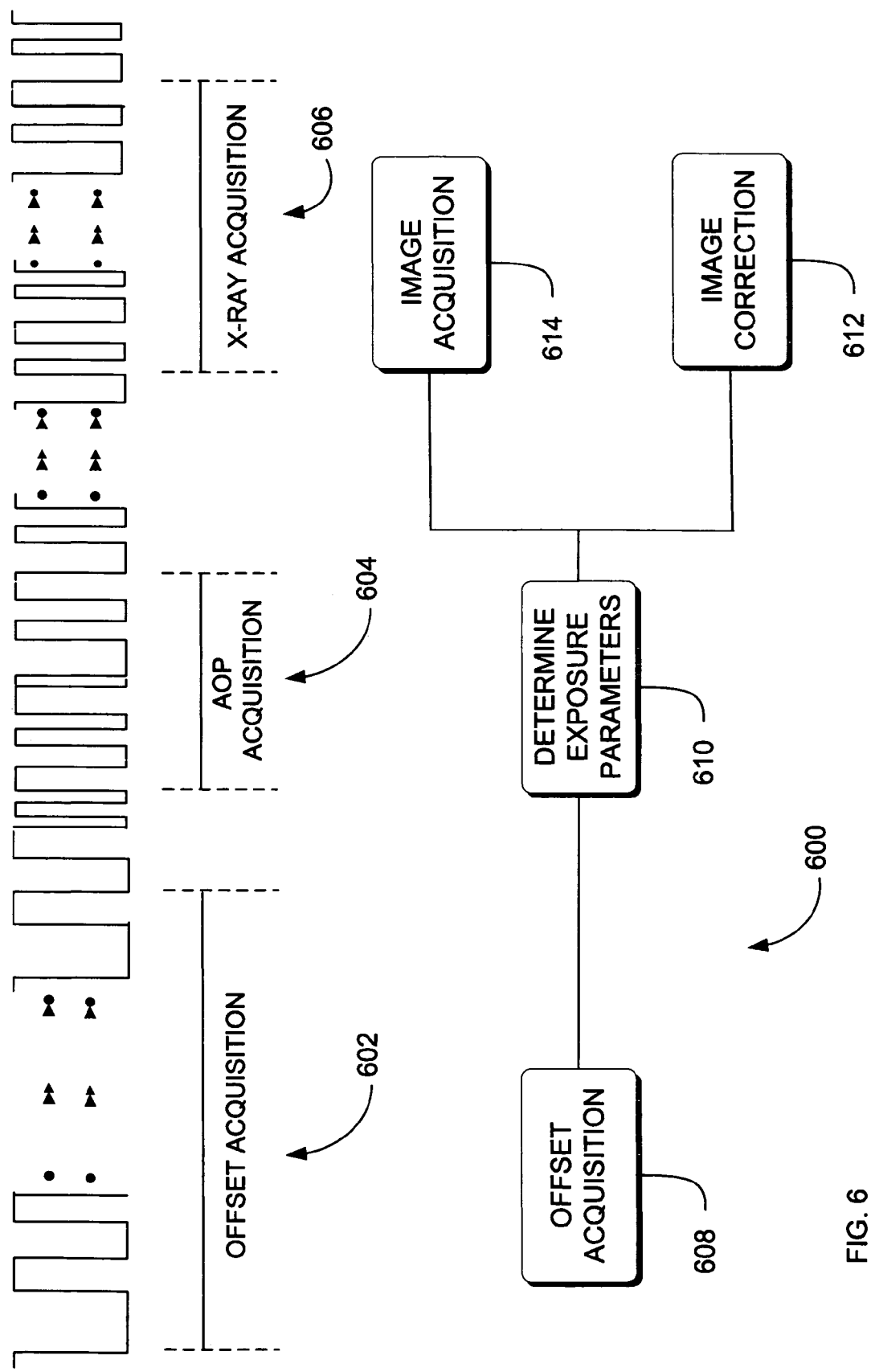
FIG. 6 is a timing diagram illustrating offset acquisition, automatic optimized parameter acquisition, and x-ray acquisition according to an embodiment.

In action 504, an offset map at different exposure windows is determined The offset map is numbered in a sequential manner beginning with the first offset and ending with the maximum number of offsets selected by the user or system. For example, the first offset would be "offset1" and the last offset would be "offset16" when the user selects sixteen (16) offsets. The offset map, acquired at different exposure windows, is a correction to offset noise that may originate from the X-ray detector 112 and/or from the electronics (not shown) that interfaces with the operation of detector 112. The offset noise component for each pixel is available by averaging over several frames of images without X-ray exposure in advance of an actual examination as shown in FIG. 6 in offset acquisition at different exposure lengths. Correction or subtraction data for the offset noise component can be collected based on the offset noise component. Once the offset are acquired at different windows, control passes to action 506 for further processing.

In action 506, an offset map by averaging is created having the number of the offset and the number of different windows. The exposure window represents a sample for a given operating range for the imaging system 100, in particular the flat panel detector 112, as illustrated in FIG. 6 at 602 under offset acquisition. As the illustration shows an offset window has a define width and multiple windows are used in the acquisition process. These values are averaged by the system to remove outliers or spurious readings that may result from system electronics. Averaging as used herein means: (a) taking multiple readings at a given exposure window and then averaging those readings to arrive at a value; (b) averaging the acquired offsets over one or more exposure windows to arrive at an average offset; or, (c) averaging individual data reading at each exposure window and then averaging the acquired offsets. Control then passes to action 508 for further processing.

In action 508, a decision is made as to whether or not the required numbers of offset maps have been acquired for the imaging device. This determination is made based on the number of offset maps desired by the user or system in accordance to action 502. If there is a requirement for more than one offset map then control passes to action 504 for adding to the existing offset map at different time windows. Each offset map is appended to the previously determined offset map in order to build multiple offsets at different exposure windows. When the whole process is completed, there will be multiple offsets (16) at different exposure windows and control is transferred to action 510 for further processing.

In action, 510 the offset maps are stored in a lookup table for use by imaging system 100. The lookup table consists of the desired number of offset maps and an average offset map at different exposure windows.

FIG. 6 is a block and timing diagram showing of the operation from offset acquisition to x-ray acquisition of the imaging system 100. The operation begins with offset acquisition 602 for generating an offset map. As can be seen the acquisition pulses have the same or different pulse widths to represent the different offset windows that make up the offset map. In general the system, during offset acquisition 608, automatically acquires multiple, 16 or 32 offsets, offsets with different fixed windows such as windows 50 ms, 100 ms, 150 ms, 200 ms, 250 ms, 300 ms, . . . , 500 ms. During offset acquisition several-fixed windows to cover different x-ray times to accommodate differences in the patient's anatomy. After each acquisition, system averages 16 or 32 offsets for each fixed window, create an offset map, such as, offset050.map, offset100.map, etc, and store them in the system memory.

The acquisition then follows with automatic optimized parameters (AOP) acquisition 604 for imaging system 100. During AOP the system determines exposure parameters 610 and the x-ray window for imaging system 100 in particular flat panel detector 112. During the x-raying process a single pre-exposure or first x-ray with real time automatic exposure control (AEC) sensor feedback will determine actual x-ray exposure length. The exposure length is used by imaging system 100 to select the pre-determined x-ray window that just covers the required x-ray exposure time. Additionally the first image may be used by the operator at workstation 130 to position the patient during x-ray imaging. Additionally, the pre-determined x-ray window is one of fixed window used for offset acquisition using the offset map from lookup table 308. Both AOP acquisition 606 and x-ray acquisition 608 are performed during patient exam time so parameters based on the anatomy of the patient can be acquired with specificity and noted by imaging system 100; while offset acquisition 602 is performed before AOP and x-ray acquisition making the offset map available to imaging system 100 at the beginning of x-ray acquisition.

Finally, the system uses the offset acquisition and AOP acquisition to perform x-ray acquisition 606. During x-ray acquisition 606 imaging system 100 performs image acquisition 614 and image correction 612 simultaneously. The simultaneous acquisition and correction of acquired images meets the need in the art for quick x-ray conversion thus shortening the examination process. The storing of offset maps in imaging system 100 allows for processing of an x-ray image while performing image sequence acquisition and thus minimizes the time between the acquisition and final display of processed images since tasks that needed to be performed sequentially can now be performed in parallel leading to reduction in time. This arrangement meets the need in the art for reducing signal conversion time and for reducing patient exam time.

Figure 7:
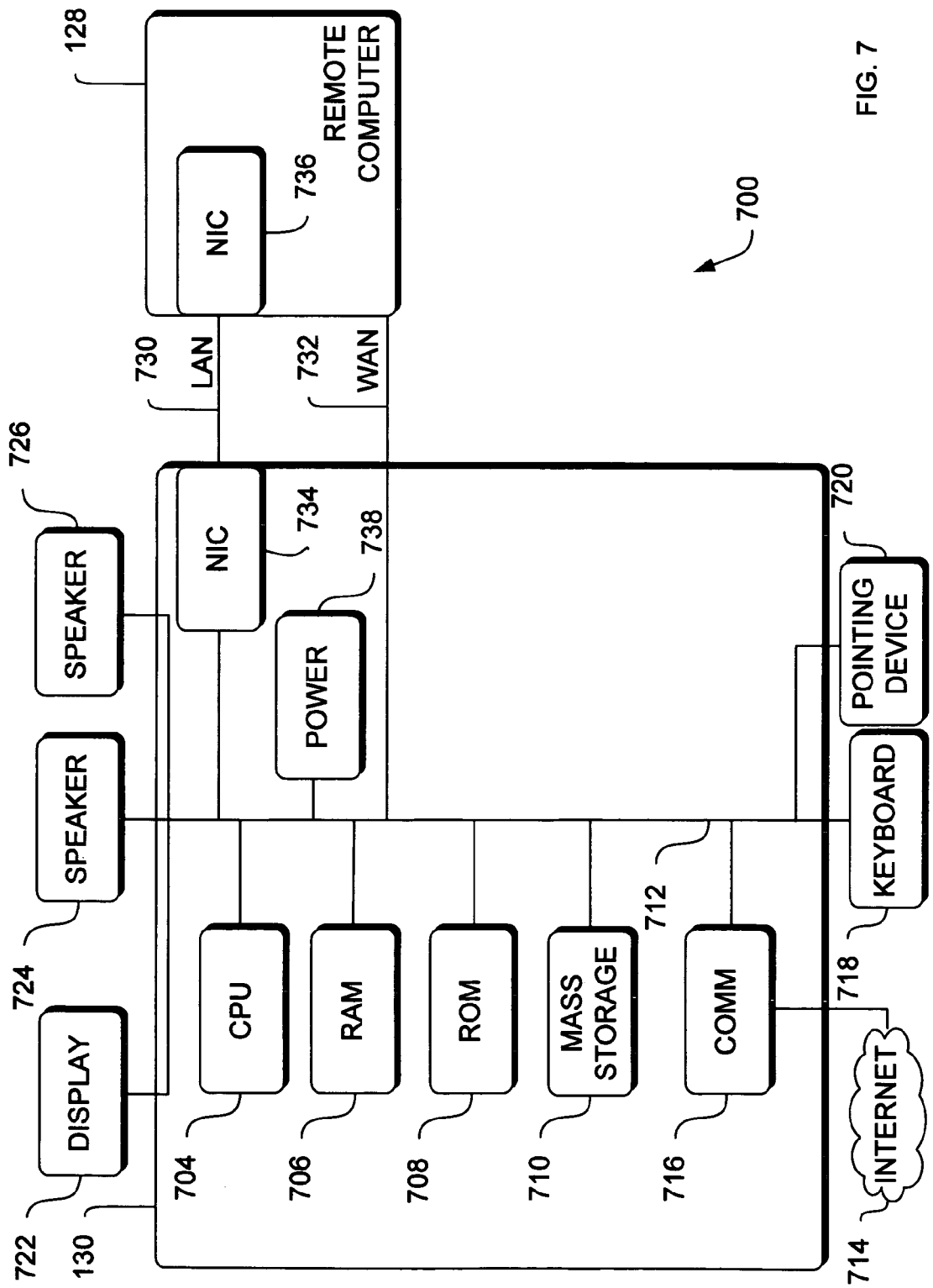
FIG. 7 is a block diagram of the hardware and operating environment in which different embodiments can be practiced.

In some embodiments, methods 400–500 are implemented as a computer data signal embodied in a carrier wave, that represents a sequence of instructions which, when executed by a processor, such as processor 704 in FIG. 7, cause the processor to perform the respective method. In other embodiments, methods 400–500 are implemented as a computer-accessible medium having executable instructions capable of directing a processor, such as processor 704 in FIG. 7, to perform the respective method. In varying embodiments, the medium is a magnetic medium, an electronic medium, or an optical medium.

Hardware and Operating Environment

FIG. 7 is a block diagram of the hardware and operating environment 700 in which different embodiments can be practiced. The description of FIG. 7 provides an overview of computer hardware and a suitable computing environment in conjunction with which some embodiments can be implemented. Embodiments are described in terms of a computer executing computer-executable instructions. However, some embodiments can be implemented entirely in computer hardware in which the computer-executable instructions are implemented in read-only memory. Some embodiments can also be implemented in client/server computing environments where remote devices that perform tasks are linked through a communications network. Program modules can be located in both local and remote memory storage devices in a distributed computing environment.

Computer 130 includes a processor 704, commercially available from Intel, Motorola, Cyrix and others. Computer 130 also includes random-access memory (RAM) 706, read-only memory (ROM) 708, and one or more mass storage devices 710, and a system bus 712, that operatively couples various system components to the processing unit 704. The memory 706, 708, and mass storage devices, 710, are types of computer-accessible media. Mass storage devices 710 are more specifically types of nonvolatile computer-accessible media and can include one or more hard disk drives, floppy disk drives, optical disk drives, and tape cartridge drives. The processor 704 executes computer programs stored on the computer-accessible media.

Computer 130 can be communicatively connected to the Internet 714 via a communication device 716. Internet 714 connectivity is well known within the art. In one embodiment, a communication device 716 is a modem that responds to communication drivers to connect to the Internet via what is known in the art as a "dial-up connection." In another embodiment, a communication device 716 is an Ethernet® or similar hardware network card connected to a local-area network (LAN) that itself is connected to the Internet via what is known in the art as a "direct connection" (e.g., T1 line, etc.).

A user enters commands and information into the computer 130 through input devices such as a keyboard 718 or a pointing device 720. The keyboard 718 permits entry of textual information into computer 130, as known within the art, and embodiments are not limited to any particular type of keyboard. Pointing device 720 permits the control of the screen pointer provided by a graphical user interface (GUI) of operating systems such as versions of Microsoft Windows®. Embodiments are not limited to any particular pointing device 720. Such pointing devices include mice, touch pads, trackballs, remote controls and point sticks. Other input devices (not shown) can include a microphone, joystick, game pad, satellite dish, scanner, or the like.

In some embodiments, computer 130 is operatively coupled to a display device 722. Display device 722 is connected to the system bus 712. Display device 722 permits the display of information, including computer, video and other information, for viewing by a user of the computer. Embodiments are not limited to any particular display device 722. Such display devices include cathode ray tube (CRT) displays (monitors), as well as flat panel displays such as liquid crystal displays (LCD's). In addition to a monitor, computers typically include other peripheral input/output devices such as printers (not shown). Speakers 724 and 726 provide audio output of signals. Speakers 724 and 726 are also connected to the system bus 712.

Computer 130 also includes an operating system (not shown) that is stored on the computer-accessible media RAM 706, ROM 708, and mass storage device 710, and is and executed by the processor 704. Examples of operating systems include Microsoft Windows®, Apple MacOS®, Linux®, UNIX®. Examples are not limited to any particular operating system, however, and the construction and use of such operating systems are well known within the art.

Embodiments of computer 130 are not limited to any type of computer 130. In varying embodiments, computer 130 comprises a PC-compatible computer, a MacOS®-compatible computer, a Linux®-compatible computer, or a UNIX®-compatible computer. The construction and operation of such computers are well known within the art.

Computer 130 can be operated using at least one operating system to provide a graphical user interface (GUI) including a user-controllable pointer. Computer 130 can have at least one web browser application program executing within at least one operating system, to permit users of computer 130 to access intranet or Internet world-wide-web pages as addressed by Universal Resource Locator (URL) addresses. Examples of browser application programs include Netscape Navigator® and Microsoft Internet Explorer®.

The computer 130 can operate in a networked environment using logical connections to one or more remote computers, such as remote computer 128. These logical connections are achieved by a communication device coupled to, or a part of, the computer 130. Embodiments are not limited to a particular type of communications device.

The remote computer 128 can be another computer, a server, a router, a network PC, a client, a peer device or other common network node. The logical connections depicted in FIG. 7 include a local-area network (LAN) 730 and a wide-area network (WAN) 732. Such networking environments are commonplace in offices, enterprise-wide computer networks, intranets and the Internet.

When used in a LAN-networking environment, the computer 130 and remote computer 128 are connected to the local network 730 through network interfaces or adapters 734, which is one type of communications device 716. Remote computer 128 also includes a network device 736. When used in a conventional WAN-networking environment, the computer 130 and remote computer 128 communicate with a WAN 732 through modems (not shown). The modem, which can be internal or external, is connected to the system bus 712. In a networked environment, program modules depicted relative to the computer 130, or portions thereof, can be stored in the remote computer 128.

Computer 130 also includes power supply 738. Each power supply can be a battery.

Conclusion

An apparatus and method has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations. For example, although described in object-oriented terms, procedural terms, or sequential terms one of ordinary skill in the art will appreciate that implementations can be made in a myriad of design environment or any other design environment that provides the required relationships.

In particular, one of skill in the art will readily appreciate that the names of the methods and apparatus are not intended to limit embodiments. Furthermore, additional methods and apparatus can be added to the components, functions can be rearranged among the components, and new components to correspond to future enhancements and physical devices used in embodiments can be introduced without departing from the scope of embodiments. One of skill in the art will readily recognize that embodiments are applicable to future communication devices, different file systems, and new data types.

We claim:

1. A method for compensating for offset signals produced by a flat panel detector in a radiographic device, the method comprising:
    generating one or more offset map for said radiographic device during a non-imaging state;
    generating a pre-exposure x-ray with said radiographic device;
    determining exposure parameters from said pre-exposure x-ray generated by said radiographic device;
    selecting an offset map from said one or more offset map from the determined exposure parameters; and
    applying said selected offset map to subsequent x-ray images from said radiographic device.

2. The method of claim 1, wherein generating one or more offset map further comprises storing one or more offset map in a look-up table.

3. The method of claim 2 wherein the look-up table further comprises:

a plurality of exposure windows, wherein an exposure window is an interval of x-ray exposure; and a plurality of offsets, wherein an offset is a correction value for the interval of x-ray exposure.

4. The method of claim 3, wherein said plurality of offsets further comprises an averaged offset map for said plurality of exposure windows.

5. The method of claim 3, wherein said plurality of exposure windows further comprise a range from 2 milliseconds (ms) to maximum exposure time.

6. The method of claim 4, wherein said averaged offset map further comprises: averaging each of said plurality of offsets at each of said plurality of exposure windows.

7. A method for tomosynthesis x-ray imaging a section of an object by use of an imaging device, comprising:

acquiring one or more offset map for said imaging device;

generating a pre-exposure x-ray with said imaging device; determining exposure parameters from said pre-exposure x-ray generated by said imaging device;

irradiating the object with x-ray radiation, from a series of positions defining an arc about a region, the arc spanning a plane intersecting the object and having an axis of rotation on a line in the plane and perpendicular to the imaging device;

detecting the radiation transmitted through the object with a stationary detector array and storing image data for each of the positions, the image data being representative of x-ray intensity values;

applying an offset map to said stored image data based on said exposure parameters for said imaging device;

repeating the actions of irradiating, detecting, and applying until said section of the object has been imaged by the imaging device; and generating a three-dimensional image of the section of the object from the stored image data.

8. The method of claim 7 wherein acquiring one or more offset map further comprises storing one or more offset map in a look-up table.

9. The method of claim 8, wherein the look-up table further comprises, a plurality of exposure windows, wherein an exposure window is an interval of x-ray exposure; and a plurality of offsets, wherein an offset is a correction value for the interval of x-ray exposure.

10. The method of claim 9, wherein said plurality of offsets further comprises one or more offset map and an averaged offset map at said plurality of exposure windows.

11. The method of claim 10, wherein each of said plurality of exposure windows further comprise:

a range from 50 milliseconds (ms) to maximum exposure time.

12. The method of claim 10, wherein said averaged offset map further comprises:

averaging each of said plurality of offsets at each of said plurality of exposure windows.

13. A computer-readable medium on which is stored executable instructions for removing an offset noise element from an X-ray image, the executable instructions directing a processor to perform:

receiving an X-ray image with an offset noise element from an X-ray apparatus;

acquiring one or more offset map for said X-ray apparatus;

generating a pre-exposure x-ray with said X-ray apparatus; determining exposure parameters from said pre-exposure x-ray generated by said X-ray apparatus;

selecting an offset map from said one or more offset map from the determined exposure parameters; and subtracting based on the selected offset map said offset noise element from said received X-ray image with an offset noise element; and displaying the offset noise reduced X-ray image.

14. An X-ray diagnosis apparatus, comprising:

a generator configured to generate X-ray signals;

a flat panel detecting device, including a plurality of pixels in a matrix, configured to detect said X-ray signals;

a processor device configured to process the detected X-ray signals to obtain an X-ray image, the processor including:

a look-up table with one or more offset map for said flat panel detecting device, wherein said one or more offset map were acquired during a non-imaging state;

a first storage device for storing exposure parameters from a pre-exposure x-ray generated by said flat panel detecting device;

a second storage device for storing an offset map selected from said one or more offset map based on said exposure parameters in said first storage device;

an image processing device for applying said selected offset map to x-ray images from said flat panel detecting device.

15. The apparatus of claim 14, wherein said look-up table, said first storage device, and said second storage device are portioned from a single storage unit.

16. The apparatus of claim 14, wherein the look-up table further comprises:

a plurality of exposure windows, wherein an exposure window is an interval of x-ray exposure; and a plurality of offsets, wherein an offset is a correction value for the interval of x-ray exposure.

17. The apparatus of claim 16, wherein said plurality of offsets further comprises one or more offset map and an averaged offset map for each said plurality of exposure windows.

18. The apparatus of claim 17, wherein each of said plurality of exposure windows further comprise a range from a minimum exposure time to a maximum exposure time, wherein said minimum and said maximum are selected based on one or more flat panel detector or purpose of diagnosis.

19. The apparatus of claim 17 wherein said averaged offset map further comprises:

averaging each of said plurality of offsets at each of said plurality of exposure windows.

20. A tomosynthesis apparatus, comprising:

an x-ray tomography machine having an x-ray source and flat panel detector for producing a plurality of x-ray projection images of a subject;

a processing device, connected to receive said plurality of projection images, for:

acquiring one or more offset map for said flat panel detector;

generating a pre-exposure x-ray with said flat panel detector; determining exposure parameters from said pre-exposure x-ray generated by said flat panel detector;

irradiating the object, with x-ray radiation, from a series of positions defining an arc about a region, the arc spanning a plane intersecting the object and having an axis of rotation on a line in the plane and perpendicular to the flat panel detector;

detecting the radiation transmitted through the object with the flat panel detector and storing image data for each of the positions, the image data being representative of x-ray intensity values;

applying an offset map to said stored image data based on said exposure parameters for said flat panel detector;

repeating the actions of irradiating, detecting, and applying until said section of the object has been imaged by the flat panel detector; and generating a three-dimensional image of the section of the object from the stored image data.

21. The tomosynthesis apparatus of claim 20, wherein the tomosynthesis apparatus further comprises:

a look-up table for storing the acquired one or more offset map for said flat panel detector.

22. The tomosynthesis apparatus of claim 21, wherein the look-up table further comprises:

a plurality of exposure windows, wherein an exposure window is an interval of x-ray exposure; and a plurality of offsets, wherein an offset is a correction value for the interval of x-ray exposure.

23. The tomosynthesis apparatus of claim 22, wherein said plurality of offsets further comprises at least an averaged offset map and one or more offset map for each said plurality of exposure windows.

24. The tomosynthesis apparatus of claim 22, wherein said plurality of exposure windows can range from substantially 2 milliseconds to a maximum exposure time.

25. The tomosynthesis apparatus of claim 23 wherein said averaged offset map further comprises:

averaging each of said plurality of offsets at each of said plurality of exposure windows.

* * * * *